Aug. 30, 1949.  B. N. WICKWIRE  2,480,800
ILLUMINATING ATTACHMENT FOR COMPACTS
Filed March 19, 1947  2 Sheets-Sheet 1
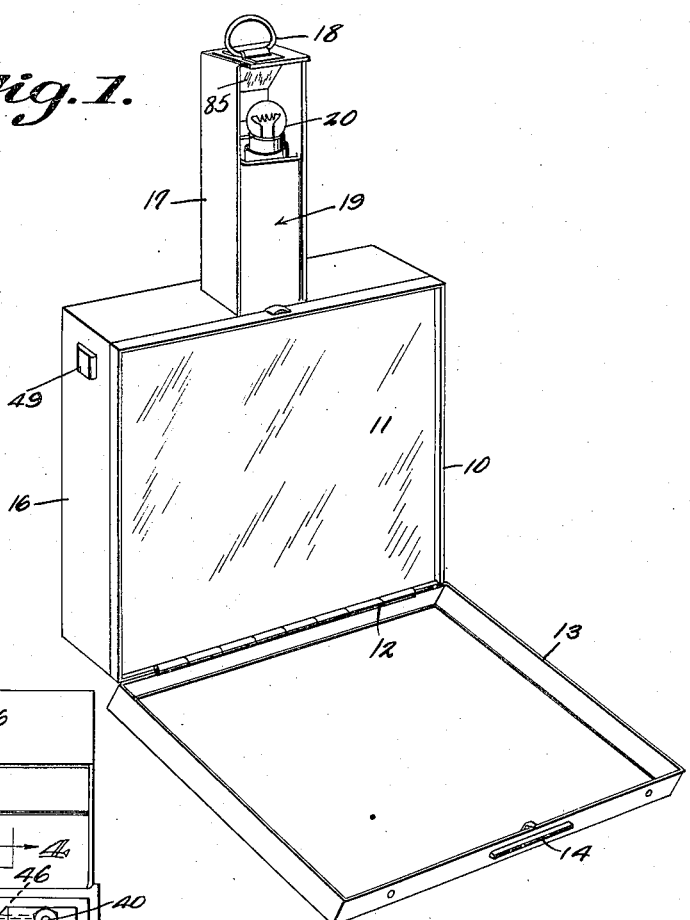
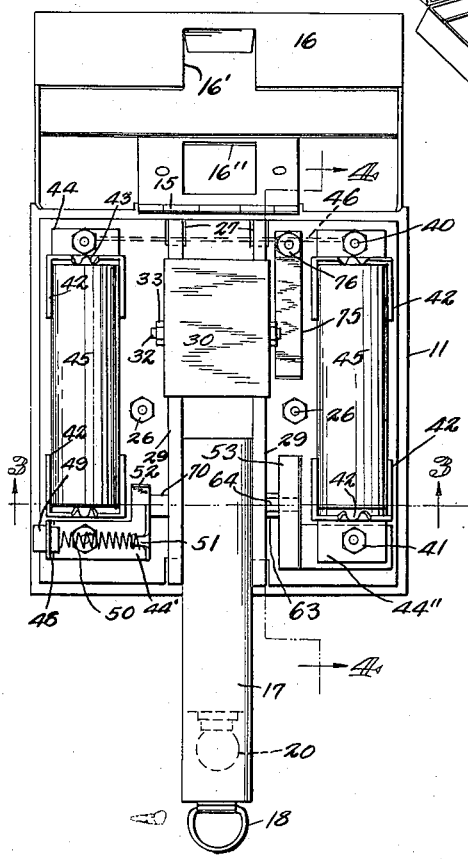
Inventor
B. N. Wickwire
By Knowles
Attorneys.

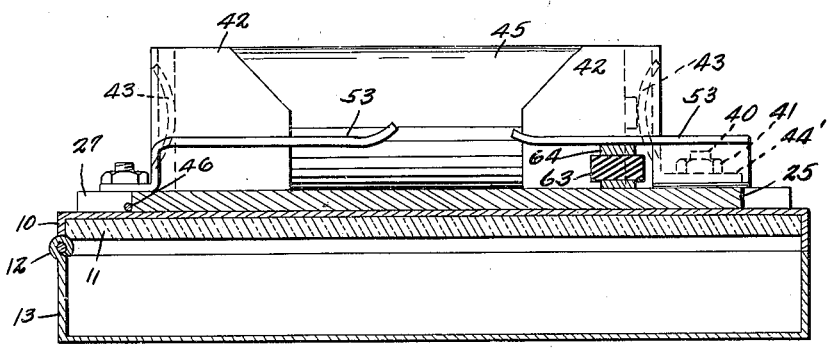
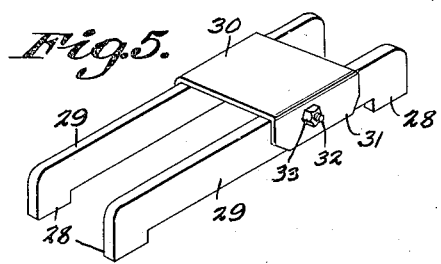
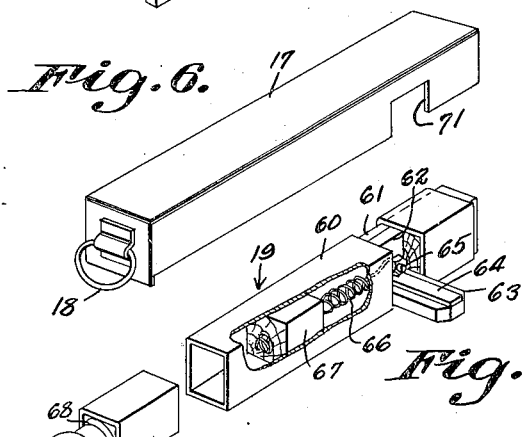
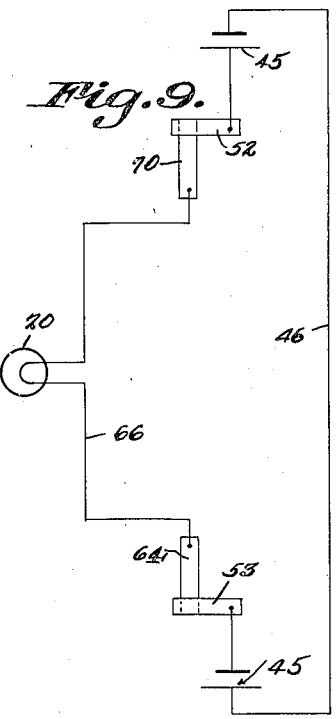
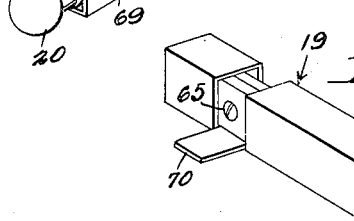

Patented Aug. 30, 1949

2,480,800

UNITED STATES PATENT OFFICE 2,480,800

ILLUMINATING ATTACHMENT FOR COMPACTS

Bertram N. Wickwire, Westchester, N. Y.

Application March 19, 1947, Serial No. 735,694

1 Claim. (Cl. 240—6.45)

This invention relates to an illuminating attachment for compacts, and more particularly to a self-contained unitary light in association with a compact, for the purpose of illuminating the face of the person using the compact.

A primary object of the invention is the provision of an improved compact, characterized by a self-contained light, adapted, when the compact is in use to illuminate the face of the user, thus insuring the application of cosmetics, with facility.

An additional object of the invention is the provision of such a construction having a slidable light housing therein, which serves effectively to protect the light bulb from damage when the device is not in use.

A further object of the invention is the provision of such a device having means for suitably positioning a light bulb well above the mirror, and reflecting a light therefrom towards the face of the user, without interferring with the use of the full extent of the mirror.

An additional object of the invention is the provision of such a device providing reflecting means whereby the light cast by the bulb is deflected from the eyes of the user, thus providing more satisfactory illumination.

Still another object of the invention is the provision of such a device wherein the entire illumination of the bulb is focused and directed towards the face of the user, and not disseminated in all directions.

A further object of the invention is the provision of such a device which is sturdy and durable in construction, reliable and efficient in operation, and relatively simple and inexpensive to manufacture, assemble, and utilize.

With the foregoing and other objects in view which will appear as the description proceeds, the invention consists of certain novel details of construction and combinations of parts, hereinafter more fully described and pointed out in the claims, it being understood that changes may be made in the construction and arrangement of parts without departing from the spirit of the invention as claimed.

Referring to the drawings

Figure 1 is a perspective view of one form of compact showing the device of the instant invention in association therewith, and in operative position.

Figure 2 is a rear elevational view of the device in Figure 1, showing the rear casing holding the batteries and the bulb slide in open position.

Figure 3 is a sectional view taken substantially on the line 3—3 of Figure 2 in view of the direction indicated by the arrows.

Figure 4 is an enlarged sectional view taken substantially along the line 4—4 of Figure 2 in view of the direction indicated by the arrows.

Figure 5 is a perspective view of a constructional detail comprising the guide ways for the light slide.

Figure 6 is a perspective view of the housings for the light slide.

Figure 7 is a disconnected perspective view, parts thereof being broken away, of the light slide as well as certain of the interior mechanism.

Figure 8 is a fragmentary perspective view of a portion of the construction shown in Figure 7, disclosing the opposite side thereof.

Figure 9 is a systematic wiring diagram showing the electrical circuit utilized in conjunction with the apparatus.

Similar reference characters refer to similar parts throughout several views of the drawings.

Referring now to the drawings in detail, the device of the instant invention comprises a central plate 10, provided on one side thereof with a mirror 11, to which plate is secured as by means of a hinge 12 a front casing 13, adapted to hold powder or similar cosmetics, and provided with a conventional latch 14.

Hingedly secured to the rear of plate 10 as by a hinge 15 (see Figure 2) is a battery housing 16, provided, in the edge opposite the hinge with an aperture 16', within which is slidably mounted, in a manner to be more fully described hereinafter, a slide housing 17, of a length substantially equal to the length of the housing 16, and provided at its upper extremity with a handle 18, by means of which the slide housing may be moved lineally with respect to the battery casing 16. The housing 17 is adapted to contain a light casing generally indicated at 19, having positioned therewithin a bulb 20, in a manner to be more fully described hereinafter.

An aperture 16'' is also provided in the wall of casing 16 adjacent the hinge 15, in alignment with the aperture 16', in such manner that by inserting a finger in the aperture 16', the housing 17 and its associated mechanism, may be moved to the position shown in Figure 1, if desired.

Secured to the rear of central plate 10 on the side opposite the mirror 11 is a panel 25, preferably embodying insulating material, and secured as by means of suitable screws and nuts 26 as well as other connections to be more fully described hereinafter.

The panel 25 is provided on opposite sides with aligned pairs of grooves 27, adapted for the accommodation of ears 28 depending from guide members 29, of insulating material, adapted to serve as guides for the light housing 17, in a slidable movement into and out of the housing 16.

Guides 29 are adapted to be connected and held in related assembly by means of a top plate 30, having depending flanges 31, suitably apertured for the accommodation of bolts 32, and secured to the member 29 by means of bolts 32 and nuts 33 (see Figure 5).

The panel 25 has secured thereto, as by means of screws 40 and nuts 41, two pairs of aligned battery-holding clips 42, positioned on opposite sides of and in parallel alignment with the members 29. Each battery clip is provided with a contact member 43 which is in electrical association with a flange 44, the screws 40 being passed through the flanges 44 for the purpose of holding the parts in related assembly.

Batteries 45 are positioned between the clamps of each pair and held in position thereby. The two plates 44 at the rear of the casing are connected in electrical association as by means of a wire 46 extending between the associated bolts.

One of the plates 44, designated as 44', carries a pair of upwardly extending lugs 48, one of which is apertured to receive a latch button 49, forced outwardly as by means of the spring 50 held in position by a lug 51 on the opposite plate, the push button 49 being adapted to pass through a suitable aperture in the side wall of the housing 16 for the purpose of holding the parts in closed relation.

Obviously inward pressure on the button 49 will permit disengagement of the housing, and consequent pivotal movement about its hinge 50 for the purpose of providing access to the interior of the housing.

The plate 44' also carries a spring contact member 52, the purpose of which will be more fully described hereinafter. The corresponding plate to 44, designated by the reference character 44'' on the opposite side of the light housing 17, has a corresponding spring clip 53 substantially aligned with the clip 52.

Referring now particularly to Figures 7 and 8, it will be seen that the member 19 comprises a rectangular casing 60, within which are positioned two parallel members 61 and 62 of insulating material, the member 62 being provided with an outwardly extending portion 63, and having on its upper surface a contact plate 64 secured to the member 62 as by a screw and nut 65.

A coiled wire 66 leads from the screw 65 through an insulating block 67, and is placed in electrical association with a light socket 68 supporting the bulb 20 in a slidable rectangular member 69 insertable in the open end of the member 19.

The member 19 is cut away at an intermediate point, to provide a space for the lateral extension of contact members 64. Extending through this space on the opposite side thereof is a second contact member 70, adapted to form a ground connection when the circuit is closed in a manner to be described more fully hereinafter.

The slide casing 17 is provided with a cutaway portion 71 through which the contact member 64 is adapted to extend. As best shown in Figure 3, the contact member 70 extends transversely beneath the slide and out beneath the extension 63 of insulating material. It may here be pointed out that the ears 28 of the members 29 are of sufficient extent to space the latter above the plate 25, to permit free sliding movement of slide housing 17, and its associated internal mechanism, the contacts 70 and 64 extending outwardly to meet the members 29.

A spring clip 75 secured to plate 25 as by means of a nut and bolt is adapted when the device is in inoperative position to engage contact 64 and contact extension 63 to hold the parts in retracted or inoperative position.

It is pointed out that the clip 75 is insulated from the casing, and consequently no circuit is closed when the clip is engaged by contact 64.

From the foregoing, the operation of the device should now be readily understandable. When the device is in retracted position, the circuit between the batteries 45 and the bulb 20 is broken, the parts are held against slippage by the spring clip 75. However, when it is desired to utilize the device for illumination, a pull on the ring 18 will cause the parts to assume position shown in Figure 1, whereupon the contact 70 will engage the contact 52, thus closing a circuit, as indicated in Figure 9 between the bulb 20 and the batteries 45 causing illumination of the bulb.

As best shown in Figure 1, a suitable mirror 85 or other reflecting surface is positioned in the top of the slide housing 17, in such manner as to reflect the light from the bulb 20 into the face of the user, thus effectively illuminating the same for reflection in the mirror 11.

From the foregoing, it will now be seen that there is herein provided an improved compact illuminating device which accomplishes all the objects of this invention, and others, including many advantages of great practical utility of commercial importance.

As various embodiments may be made of this inventive concept, and as various modifications may be made in the embodiment hereinbefore shown and described, it is to be understood that all matter herein is to be interpreted merely as illustrative and not in a limiting sense.

What is claimed is:

In an illuminating device for compacts or the like, a center plate carrying a mirror, an apertured housing hingedly secured to said plate, an insulating panel secured to said plate within said housing on the opposite side to said mirror, battery clamps on said panel, batteries held by said clamps, a guide comprising spaced guide members fitted within the housing, ears extending from the guide members engaging the wall of the housing holding the guide spaced from the wall of the housing, a plate connecting the spaced guide members, a slide member movable between the guide members and being extensible out of the aperture in said housing, a bulb carried by said slide member, means operable upon extension of said slide member to close the circuit between said battery and said bulb to illuminate the latter, said last mentioned means including spring contacts carried by certain of said battery clamps and contact members carried by said slide member engageable therewith, and means for holding said slide member in retracted position.

BERTRAM N. WICKWIRE.

REFERENCES CITED

The following references are of record in the file of this patent:

UNITED STATES PATENTS

| Number | Name | Date |
| --- | --- | --- |
| 1,172,354 | Grote | Feb. 22, 1916 |
| 1,832,492 | Marchand | Nov. 17, 1931 |
| 1,930,081 | Biller | Oct. 10, 1933 |
| 2,262,011 | Kunkel et al. | Nov. 11, 1941 |
| 2,325,476 | Cleve | July 27, 1943 |
| 2,386,255 | Morey | Oct. 9, 1945 |

FOREIGN PATENTS

| Number | Country | Date |
| --- | --- | --- |
| 713,490 | France | Aug. 17, 1931 |
| 318,852 | Germany | Feb. 16, 1920 |

Certificate of Correction

Patent No. 2,480,800 — August 30, 1949

BERTRAM N. WICKWIRE

It is hereby certified that errors appear in the above numbered patent requiring correction as follows:

In the grant, line 3, and in the heading to the printed specification, line 4, address of inventor, for "Westchester" read *Pelham Manor*; and that the said Letters Patent should be read with these corrections therein that the same may conform to the record of the case in the Patent Office.

Signed and sealed this 27th day of December, A. D. 1949.

[SEAL]

THOMAS F. MURPHY,
*Assistant Commissioner of Patents.*